May 27, 1930.                E. M. ROSENFIELD                1,760,663
                        BUSHING CLAMP CONNECTING DEVICE
                              Filed June 23, 1927
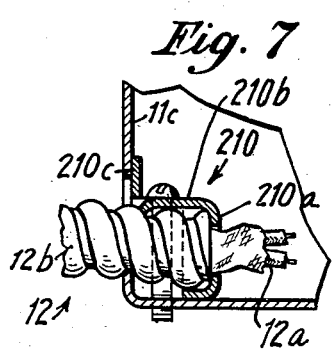
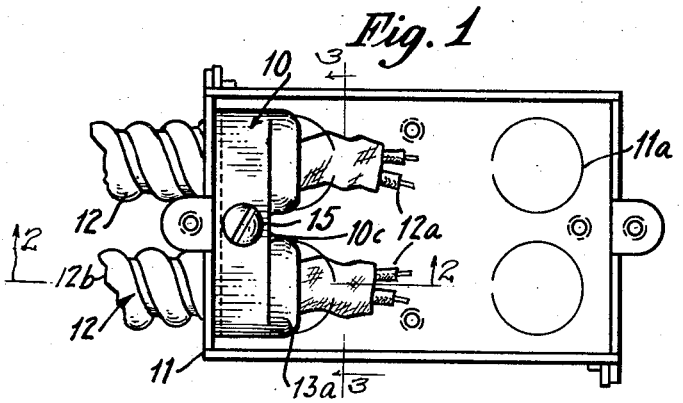
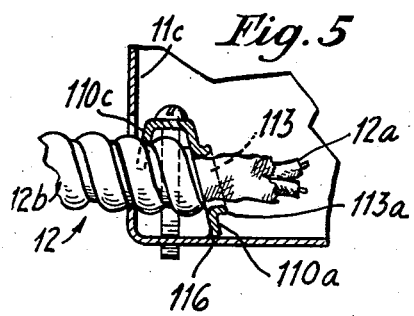
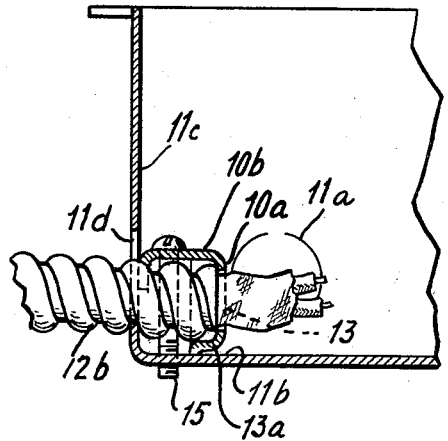
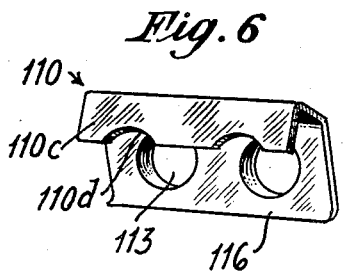
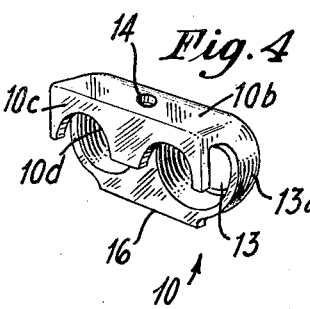
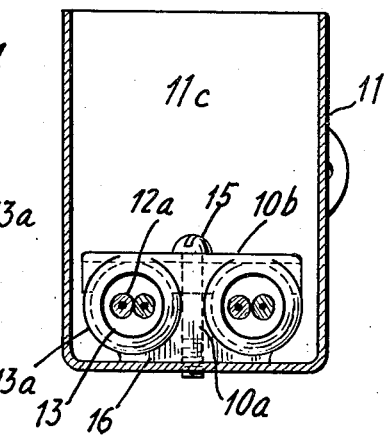
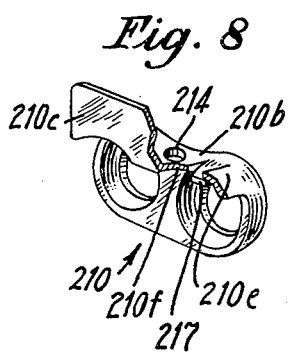
INVENTOR
EDWARD M. ROSENFIELD
BY Louis Barnett
ATTORNEY Patented May 27, 1930

1,760,663

UNITED STATES PATENT OFFICE

EDWARD M. ROSENFIELD, OF NEW YORK, N. Y.

BUSHING-CLAMP-CONNECTING DEVICE

Application filed June 23, 1927. Serial No. 200,803.

This invention relates to bushing-clamp connecting devices for use in joining armored electric cables to junction, switches and outlet boxes or plates wiring installations.

One object of the invention is to provide improved connecting devices for boxes or plates of the character described, which form terminal bushings, whereby the usual requirements for protecting thimbles or sleeves on the end of sheathed or armored cables are eliminated. The clamps portion of the device serving to rigidly anchor and to effectively ground the cables.

Another object of the invention is to provide a connecting device of improved construction preferably forming a one-piece structure, which shall be simple and light yet rugged, cheap to manufacture, easy to install, and practical and efficient to a high degree in use.

Other objects of this invention will in part be obvious and in part hereinafter pointed out.

The invention accordingly consists in the features of construction, combinations of elements and arrangements of parts which will be exemplified in the construction hereinafter described and of which the scope of application will be indicated in the following claims.

In the accompanying drawing, in which is shown some of the various possible illustrative embodiments of the invention.

Fig. 1 is a top plan view of an outlet box showing armored cable ends secured therein by a bushing-clamp connecting device embodying the invention.

Figs. 2 and 3 are cross-sectional views taken on line 2—2, 3—3 respectively in Figure 1.

Fig. 4 is a perspective view of the improved device shown in Figures 1, 2, and 3.

Figs. 5 and 7 are cross-sectional views showing applications of modified construction of devices embodying the invention, and Figs. 6 and 8 are perspective views of the improved device shown in Figures 5 and 7, respectively.

Referring in detail to the drawing, 10 denotes a bushing-clamp connecting device embodying the invention which is here shown fitted into a junction or outlet box 11 for securing armored cables 12.

The outlet box 11, may be of any suitable construction well understood in the art and may be made of stamped sheet metal formed with sheared portions $11^a$, which when removed form the usual "knockout" opening $11^d$, wherethrough the ends of cables 12 pass. The cables are trimmed so that the conductor wires $12^a$ extend beyond the armor sheaths $12^d$ of the cables to facilitate connecting the wires into circuit (not shown) in the well understood manner.

The device 10, is preferably made of stamped sheet metal forming a one-piece structure. From Figs. 1 to 4 inclusive, it is seen that said device comprises a front wall portion $10^a$, having openings 13 spaced from an inner side $11^b$ of box 11.

To protect the insulations on the conductor wires $12^a$, extending beyond the cable sheathing $12^b$ from being accidentally injured by the rough, sharp and cutting edges of the severed ends of the cable armor $12^b$, the rim of the openings 13, are dished as at $13^a$, to form terminal bushings for fitting over the cable sheathing ends. By providing the bushings in the construction of the device 10, the usual protecting thimbles or sleeves usually required are dispensed with, thus simplifying the wiring construction.

Extended from the wall portions $10^a$ over the cable armor ends is the top wall portion $10^b$, which has a central opening 14 wherethrough a fastening screw 15 passes, said screw being threaded into the inner side $11^c$ of the box 11, as shown in Figs. 2 and 3. A rear wall portion $10^c$ extends down from the wall portion $10^b$ spaced from the front wall portion $10^a$. The free edge of wall portion $10^c$ is cut as at $10^d$, to conform to the contour of each of the cables. These cut edges $10^d$ and the rim of the "knockout" opening $11^d$ form a biting clamp for engaging the cable armor when the fastening screw 15 is tightened to rigidly anchor the cable 12, to the box 11.

If desired the lower edge of the front wall may be carried down as at 16 which not only provides a clamping means for securing the cables to the box but also operates to draw the cables into the device as the clamping force is applied. The biting action of the edges 10ᵈ, resist any force tending to withdraw the cables from the box 11 and serve to effectively ground the cable armor to the box.

In Figs. 5 and 6 is shown a modified construction of bushing-clamp connecting device 110 embodying the invention. The device 110 is similar to the device 10 with the exception that the openings 113 in the front wall portion 110ᵃ has the rim portions thereof outturned to form bushing 113ᵃ having smooth passages for the conductor wires and providing a protection covering for the rough, sharp and cutting edges of the cable armor ends. The cable armors 12ᵇ are clamped between the edge portions 110ᵈ, of the rear wall portion 110ᶜ and the rims of the "knockout" openings 11ᵈ on tightening the screw 15, as with the device 10. In this form the extension 116 below the openings 113 contact with the box side 11ᶜ. The edge portion 110ᵈ resists any tendency of the cables from being displaced and serve to effectively ground the cable armor to the box 11, as described above the device 10.

Another modification of the invention is shown in Figs. 7 and 8. Here the device 210 has the top wall portion 210ᵇ formed with a pair of arched sections 210ᶜ for accommodating two cables. Said sections are interconnected by a section 210ᶠ having the opening 214 through which the fastening screw 15, extends. The rear wall 210ᵉ instead of extending down as in the device 10, extends outwardly from the top wall portion 210ᵇ. Said wall 210ᵉ thus may be positioned against the inner side 11ᵇ of the box so as to form a closure for the spaces 16 between the cables and the rim portions of the box openings 13. In order to provide means on the device 210 for forming a biting engagement with the cable armors 12, tongues 217 are stamped from the arched sections 210ᶜ at a spaced distance from the front wall portion 210ᵃ. These tongues 217 serve for the same purpose and function like the edge portion 10ᶜ, and the 110ᶜ, of the devices 10 and 110, respectively, described above.

It will thus be seen that there is provided a device in which the several objects of this invention are achieved and which is well adapted to meet the conditions of practical use.

As various other possible embodiments might be made of this above mentioned, and as various changes might be made in the embodiments above set forth, it is to be understood that all matters herein set forth as shown in the accompanying drawing are to be interpreted as illustrative and not in a limiting sense.

Having thus described my invention I claim as new and desire to secure by Letters Patent:—

1. A one piece bushing clamp for securing armored electric cables in position in a junction outlet box comprising a top wall, a front wall integral with said top wall, said front wall having an opening therein smaller than the external diameter of the cable armor, the rim of said opening forming a bushing for protecting the unarmored portion of the cable against injury, and a rear wall spaced from said front wall depending from the top wall and integral therewith, said rear wall being shaped to the contour of the cable armor, and a securing device engaging said clamp and a wall of the junction box for forcing the lower edge of the front wall against an interior wall of the junction box and for forcing said rear wall into clamping engagement with the cable armor, said clamp being wholly within the junction box.

2. A one piece bushing clamp for securing armored electric cables in position in a junction outlet box comprising a top wall, a front wall integral with said top wall, said front wall having an opening therein smaller than the external diameter of the cable armor, the rim of said opening forming a bushing for protecting the unarmored portion of the cable against injury, said top wall having at the rear thereof an integral portion bent downwardly to engage the cable armor, and a securing device engaging said clamp and a wall of the box to hold the clamp in position and force said integral bent portion into clamping engagement with the cable armor whereby to secure the cable in position, said clamp being wholly within the junction box.

In testimony whereof I affix my signature.

EDWARD M. ROSENFIELD.